(12) United States Patent
Raghu

(10) Patent No.: US 7,210,937 B1
(45) Date of Patent: May 1, 2007

(54) METHOD AND APPARATUS FOR MICROFLUIDICS EDUCATION

(76) Inventor: Surya Raghu, 4217 Red Bandana Way, Ellicott City, MD (US) 21042

(*) Notice: Subject to any disclaimer, the term of this patent is extended or adjusted under 35 U.S.C. 154(b) by 609 days.

(21) Appl. No.: 10/440,871

(22) Filed: May 19, 2003

Related U.S. Application Data

(60) Provisional application No. 60/382,854, filed on May 23, 2002.

(51) Int. Cl.
   *G09B 23/06* (2006.01)
(52) U.S. Cl. .................................................. 434/283
(58) Field of Classification Search ............... 434/276, 434/283
   See application file for complete search history.

(56) References Cited

U.S. PATENT DOCUMENTS

| | | | | |
|---|---|---|---|---|
| 5,376,007 | A | * | 12/1994 | Zirm .......................... 434/262 |
| 5,484,293 | A | * | 1/1996 | Ford et al. .................. 434/432 |
| 6,783,367 | B1 | * | 8/2004 | Wang et al. ................. 434/276 |
| 6,900,776 | B2 | * | 5/2005 | Vaccarelli ................... 345/2.2 |
| 2003/0041652 | A1 | * | 3/2003 | Spaid et al. ............... 73/54.05 |

OTHER PUBLICATIONS

"Lab-on-a-Chip: A Revolution in Biological and medical Science", Figeys and Pinto; Analytical chemistry, May 1, 2000; pp. 330A-335A (retrieved from the internet url <http://pubs.acs.org/cgi-bin/article.cgi/ancham-a/0000/72/i09/html/figeys.html> Aug. 23, 2006.*

"Downsizing Chemistry"; Michael Freemantle; Science/Technology, Feb. 22, 199, vol. 77, No. 8; cenear 77 8 pp. 27-36 (retrieved from internet url <http://pubs.acs.org/isubscribe/journals/cen/77/i08/html/7708scit1.html> Aug. 23, 2006.*

* cited by examiner

*Primary Examiner*—Kathleen Mosser
(74) *Attorney, Agent, or Firm*—Ellis P. Robinson

(57) ABSTRACT

The objective of the present invention is to provide a method and apparatus for education and training in microfluidic technology. The microfluidic system training apparatus includes multiple flow configurations of microfluidic elements all configured and fabricated on a single plate, a microscope and a camera system connected to a monitor or computer, and a computer based control and data acquisition system as a means of controlling and measuring the flow properties. The hands-on experiments with the apparatus of the present invention are designed to provide students with training of varying complexity beginning with basic microfluidic flow system studies to the development of an advanced specific microfluidic flow process or protocol utilizing a variety of the conventional microfluidic elements.

7 Claims, 5 Drawing Sheets

Computer for display and control          Microscope with camera          Microfluidic plate on traverse system Schematic of the microfluidic educational system

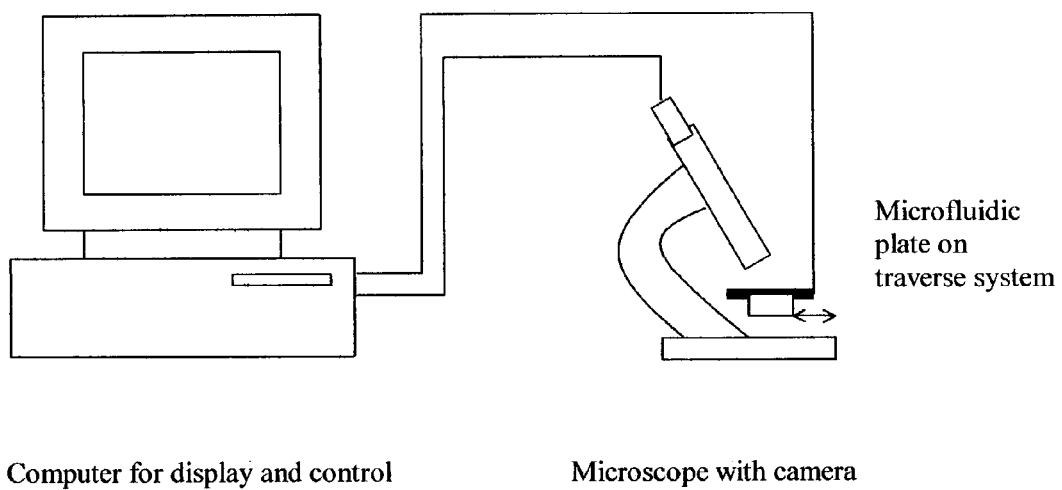
Figure 1. Schematic of the microfluidic educational system

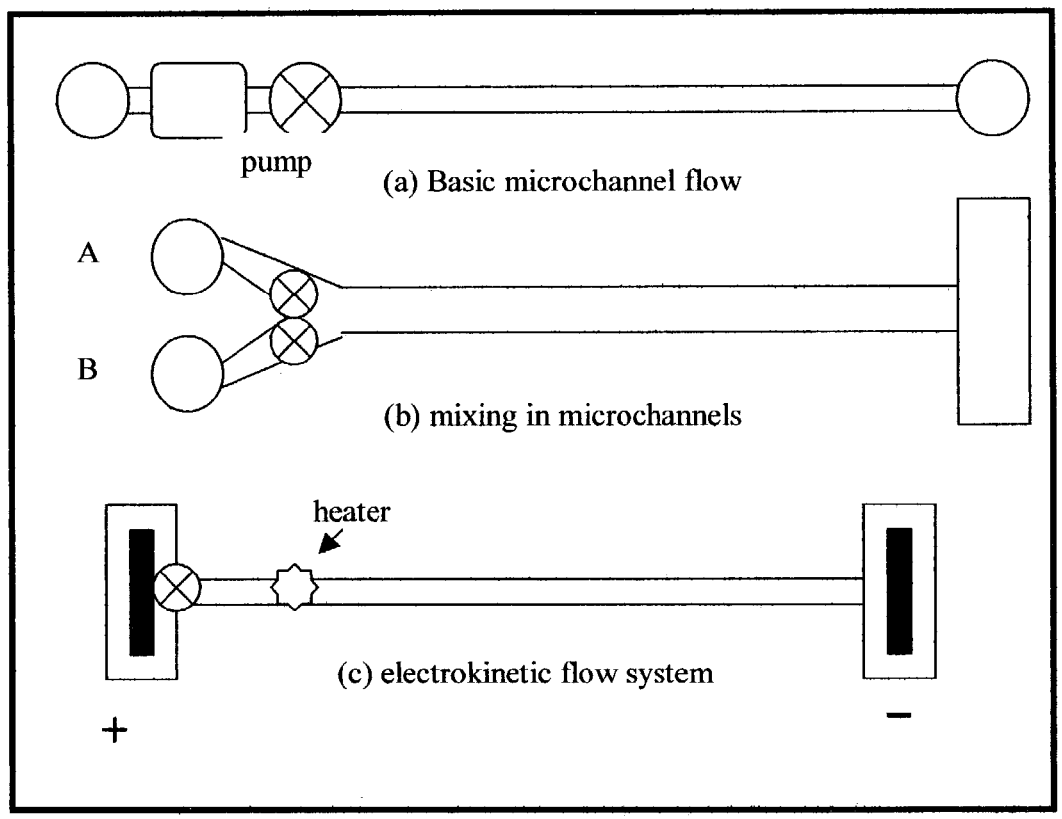
Figure 2 (a) Plate with multiple systems

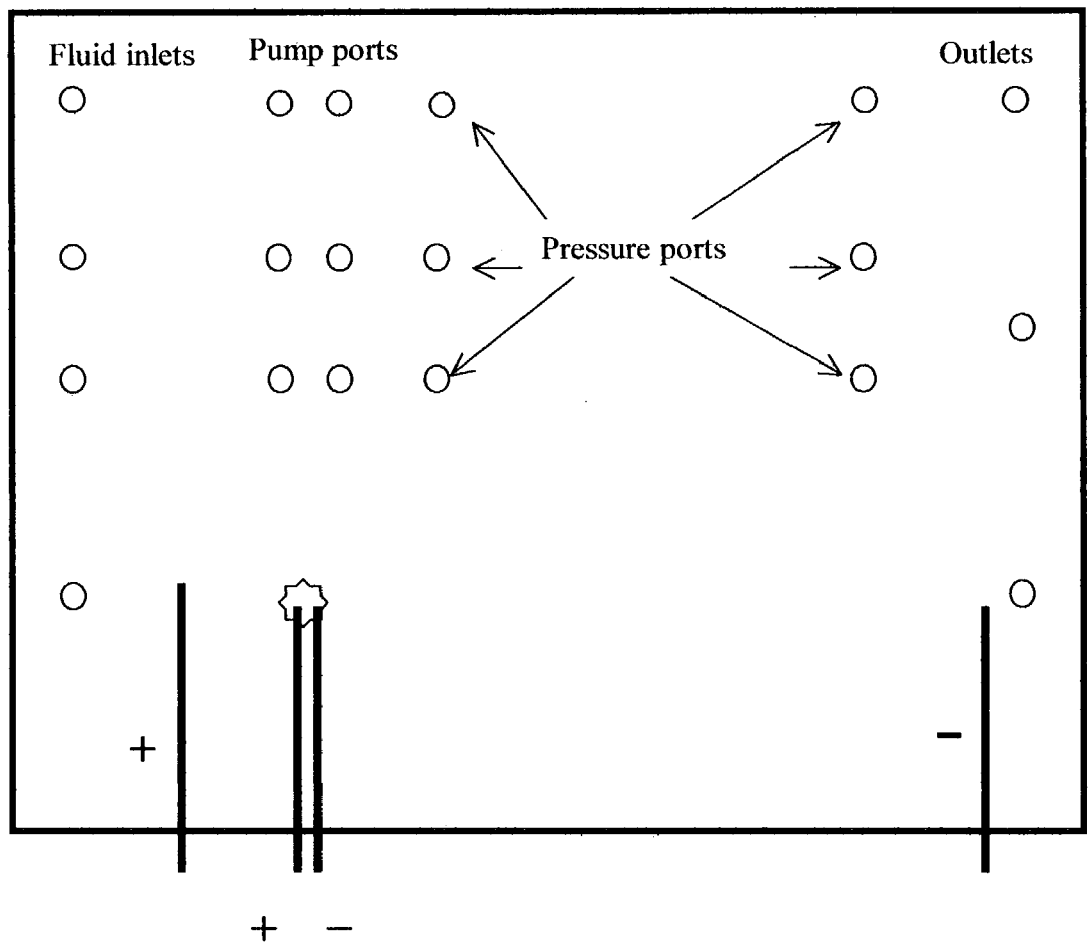
Figure 2 (b) Cover plate

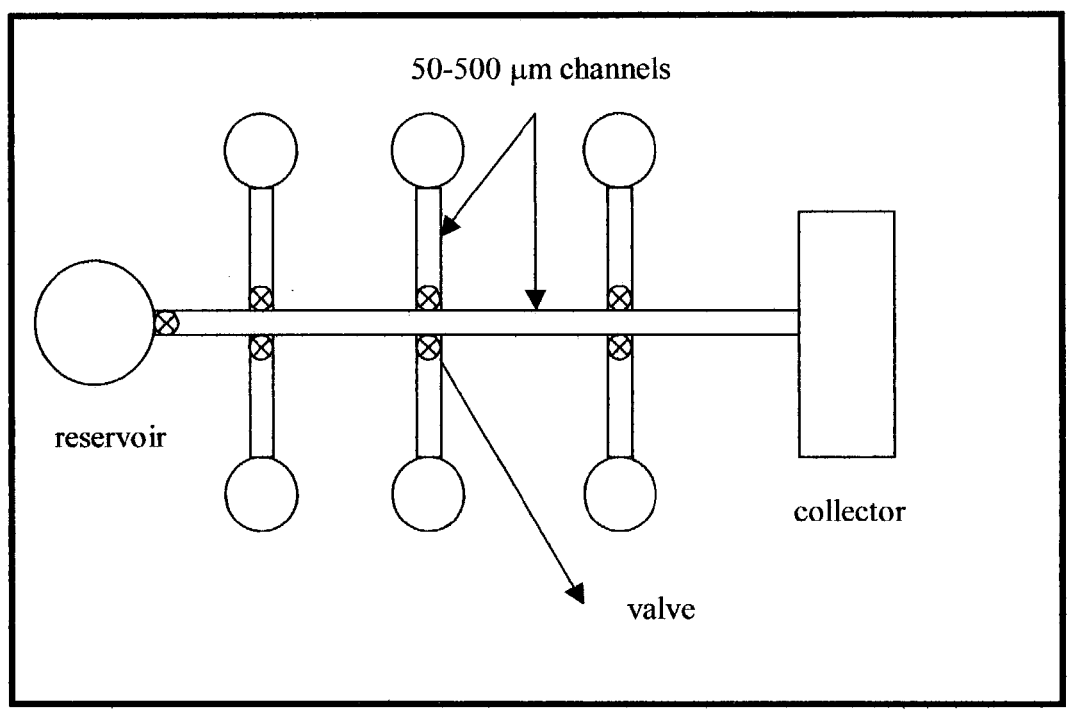
Figure 3 (a) Advanced Microfluidic Plate

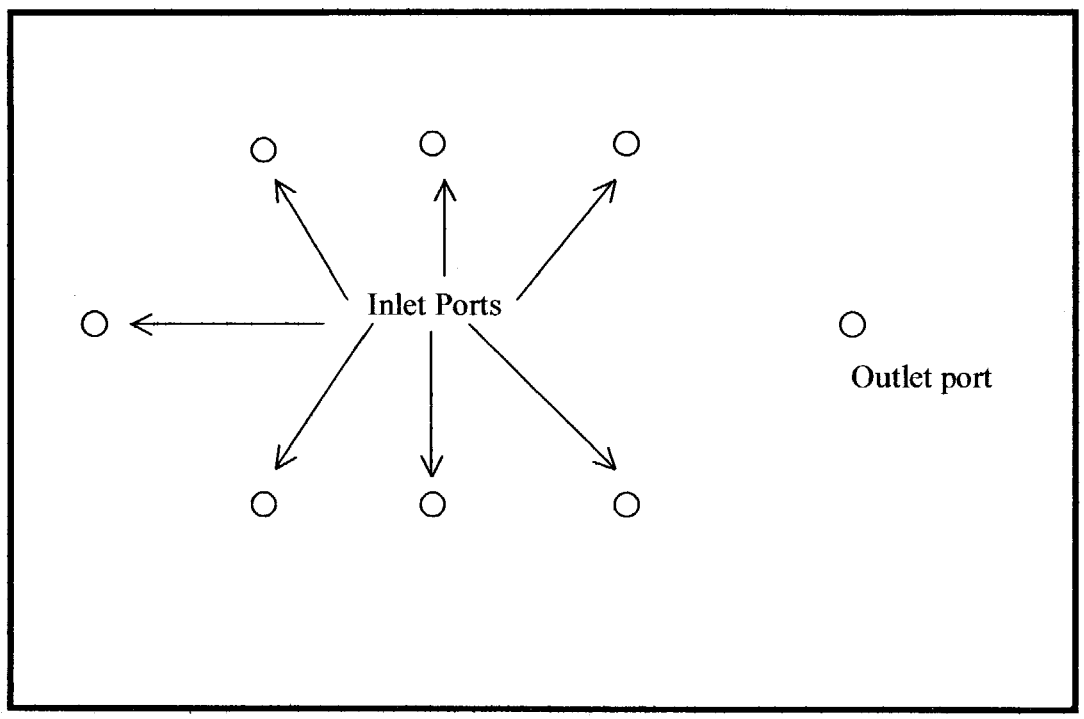
Figure 3 (b) Cover plate for the advanced microfluidic plate

METHOD AND APPARATUS FOR MICROFLUIDICS EDUCATION

BACKGROUND OF THE INVENTION

This application claims the benefit of the filing date of Provisional Patent Application No. 60/382,854, filed on May 23, 2002.

Microfluidics is the flow of fluids in very small channels having a size in the range of 1–500 microns. The flow of fluids in such microfluidic systems is significantly different than that of larger systems due to the large surface to volume ratios in Microsystems. The properties of the flow surface such as hydrophobicity, hydrophylicity, ion conductivity, roughness and adsorbtivity may play a significant role in microfluidic systems. In some cases, the fluid flow and its control is dependent on such properties.

Microfluidic systems may comprise a number of functional elements or components configured to pump the flow, mix components, heat materials, initiate chemical reactions, control and monitor a variety of fluid processes in such systems. The components may include a network of channels and reservoirs, micropumps, valves, microheaters, reaction and mixing chambers, connectors, measurement ports and sensors (either internal or external), and often imbedded electronics to control, monitor and measure the various phenomena that occur in the system.

The last decade has seen a significant amount of development in microfluidics technology aimed at the miniaturization of the currently used methods in the pharmaceutical industry for drug design and synthesis, DNA and proteomic research, as well as development of instrumentation for testing biosamples such as blood, urine, etc. Other applications include fluid handling for micro-power generators (fuel cells and microturbines), miniature liquid and gas chromatography.

A typical conventional microfluidic system comprises a plate or chip with a single flow structural configuration which may comprise 1) a network of microchannels and chambers, 2) micropumps, 3) microvalves, 4) fluidic connectors, 5) measurement and observation ports, 6) microheaters or gas injection mechanisms, 7) electrical contact point to induce electro-osmotic and electro-phoretic flows, 8) instrumentation for microflow measurement, 9) observation equipment such as a microcamera or microscope and 10) a computer to control the experiments and to record and display the systems data.

The network of microchannels and chambers may be in the range of 5–500 microns wide and 2–250 microns deep. These may be fabricated using any of the various known micromachining techniques such as bulk micromachining, surface micromaching, etching, electrodischarge machining, stamping, imprinting, micromilling and lithography. The microchannels may be fabricated from a variety of materials such as silicon, silicon dioxide, plastics, glass and metals. A variety of micropumps can be used in the present system. Examples are conventional piezo-pumps, diaphragm pumps, bubble pumps and electrokinetic pumps. These pumps are able to handle very small quantities of liquids in the range of nano- to microliters. Microvalves are necessary components used to switch on and off the flow in the channels as well as to control the flow rates. Examples of conventional microvalves include electrostatic valves, diaphragm valves, MEMS-based mechanical slides, and bubble-based valves. Fluidic connectors are required to either interconnect the various elements of a microfluidic system or the microfluidic system to external sources of fluid, pressure sources, etc. These connections can be permanent or temporary in nature. Measurement and observation ports are designed in the microfluidic system for obtaining data and observing the fluid properties, respectively. These ports are either optically or electronically accessible which measure optical, physical or chemical properties in the system. Microheaters or other gas injection mechanisms which produce vapor or gas bubbles in the channel are usual components of a microfluidic system. Microheaters are made of silicon or thin film deposition of metals such as platinum or tantalum in the form of coils. The size of the heaters may be from 50 microns to 500 microns. Electrical contact points to induce electro-osmotic and electro-phoretic flows are provided in the reservoirs of the device. When an electrically conducting liquid is filled in the reservoirs and a DC voltage is applied between the two reservoirs, a flow is generated between the reservoirs due to the mobility of the ions that are generated in the fluid. Conventional microflow measurement instrumentation is available to measure flow properties such as pressure, flow rate and temperature. Specific instruments are readily available and may be employed to measure one or more of these flow properties. Other properties that are measured are the light intensity generated by chemi-luminescence or fluorescence in the fluid and electrical currents and resistances generated by specific molecules in the fluid. Conventional microfluidic systems may employ a microscope or camera equipment for observation of the fluid flow, a computer to display the microfluidic flow, control the experiments and record the data are also used in practice.

The rapid development of the microfluidics technology has created a large demand for personnel trained to operate the large variety microfluidics systems currently being developed and in actual use. While there are a variety of educational and training systems available in the market for other technical areas such as mechatronics apparatus (U.S. Pat. No. 5,562,454), mathematical apparatus (U.S. Pat. No. 6,196,847), fluid dynamics simulator (U.S. Pat. No. 5,609,405), to the best of the inventor's knowledge, there is no single training system or apparatus for microfluidics training available in the market. The microfluidic systems currently being developed by industries—referred in literature as "lab-on-a-chip", "bio-chip" and "assay-chip" are specifically geared towards particular testing methods. These prior art microfluidic systems are not capable of providing a more comprehensive/multicomponent microfluidic system that can provide a generalized and systematic training program for the student or learner. The prior art microfluidic systems are typically designed for specific or single functionality and accomplish specific tasks or analyses, whereas the educational microfluidic system of the present invention is generically designed to serve as a microfluidic system teaching apparatus containing multiple flow structural configurations fabricated on a single plate capable of providing student training in a multiplicity of tasks and analyses at varying levels of educational difficulty. Therefore, one major object of the present invention is to provide a multicomponent or multiple flow structural configuration microfluidic systems on a single plate that may be used for educating and training scientific personnel in the use of both basic and advanced microfluidics technology systems.

SUMMARY OF THE INVENTION

The present invention is directed to a microfluidic technology educational apparatus for providing from basic to advanced training in microfluidics systems. The microfluidic apparatus comprises (1) a multicomponent or multiple flow structural configuration microfluidic system containing basic microfluidics elements configured to demonstrate with examples some features of fluid flow in a microsystem, (2) a microscope and/or a camera system connected to a monitor or computer as a means of observing the components of the microfluidic system such as microchannels, micropumps, microvalves and sensors and the flow of fluids in such a system during the experiment, and (3) a computer based control and data acquisition system as a means of controlling and measuring the flow properties. The microfluidic system is placed on a traversing system under the microscope to move into focus the different elements of the system. The microfluidic system of the present invention is designed to teach a student a large variety of basic and advanced microfluidic functions and properties by utilizing a microfluidic system on a single plate which contains several basic microfluidic elements in multiple flow structural configurations.

The student may conduct sample experiments by following the step-by-step instructions from the computer or a separate instruction manual. A large variety of experiments may be provided to train the student in; 1) the use of basic elements of a microfluidic system, 2) the observation of the flow properties in microfluidic systems, 3) the measurement in such microfluidic systems and 4) finally the design of specific processes in microfluidic systems to accomplish a given task. One exemplary embodiment of the microfluidic educational apparatus of the present invention is a microfluidic system fabricated on a single plate and configured to contain multiple individual microfluidic flow structural configurations comprising conventional microfluidic system functional elements.

BRIEF DESCRIPTION OF THE DRAWINGS

FIG. 1 shows a schematic of the educational apparatus of the present invention.

FIG. 2 shows the configuration of the basic microfluidic system of the invention.

FIG. 3 shows a second configuration for a microfluidic system of the present invention.

DETAILED DESCRIPTION OF THE INVENTION

FIG. 1 shows the schematic drawing of the educational apparatus. The microfluidic system contained in a rectangular plate of size about 50 mm×90 mm with a cover plate of the same dimensions is mounted on a traversing platform under a microscope or other equivalent optical systems so that one can focus on different parts of the system as needed. The microscope is used to observe the flow phenomenon either directly or through a camera system connected to a computer or a video monitor. The actuation of the various components in the microfluidic system such as pumps, valves and heaters is brought about by the signals generated from the computer. Sensors measure the flow rates, temperature and pressure and the data is collected, analyzed and displayed on the computer. The results can also be simultaneously compared with the results from computational fluid dynamics software included in the computer.

The computer also contains instructions and procedures for conducting the experiments with an introduction to microfluidics and each part of the subsystem.

FIGS. 2 and 3 illustrate two examples of the many embodiments of microfluidic systems of the instant invention. FIG. 2 shows three sample flow structural configurations of the basic microfluidic system on a single plate falling within the scope of the present invention. The entire microfluidic components are fabricated/assembled on a plate of a convenient handling size of about 50 mm×90 mm (about the size of a credit card) and about 1 mm in thickness. The components are fabricated using any of the various micromachining techniques such as bulk micromachining, surface micromachining, etching, electrodischarge machining (EDM), stamping, imprinting, micromilling, and lithography. The microchannels can be fabricated in a variety of materials such as silicon, silicon dioxide, glass, plastics, and metals. The cover plate is made of a clear, transparent material such as glass or plastic to observe the flow phenomenon and also contains the ports for filling the microfluidic reservoirs and connecting external micropumps and ports that can be connected to a flow meter or a pressure transducer. The cover plate also forms a tight seal with the base plate, which has the microfluidic channels and thereby preventing, or eliminating fluid leakage.

The three separate flow structural configurations on the single plate shown in FIG. 2 will be described in more detail. The top configuration shown in FIG. 2 depicts a basic microchannel flow system. This microchannel flow system has a micropump, a valve and two reservoirs connected by a microchannel. The micropump could be either a piezoelectric device, a diaphragm type pump or a bubble-based micropump. The microchannel is 50–500 micron wide and 5–250 micron deep. The reservoirs are designed to hold 50–250 microliters of fluid. Connectors are provided to fill up the reservoirs by an external fluid source contained in a syringe or a pressurized container prior to the start of the experiments. Liquid is pumped from the left reservoir to the right reservoir by means of the micropump. A pin-type valve is connected after the pump in order to regulate the flow in the channel.

The second configuration shown in FIG. 2 is a mixing flow configuration which comprises two reservoirs each having a 50–250 microliter volume containing liquid A and liquid B which are pumped using micropumps into the long mixing channel and flow into the storage chamber on the right. The mixing channel is 50–500 microns wide and 5–250 mm deep. When steady flow is pumped from both reservoirs, the mixing takes a long time (almost to the end of the channel). When alternate slugs of fluid from each reservoir are pumped, then mixing takes place very rapidly. Connectors are provided to fill up the reservoirs from external fluid sources by means of syringes or pressurized containers prior to the start of the experiments. Utilizing different colored liquids in the two reservoirs and observing the disappearance of the individual colors when they are mixed is an effective way to visually demonstrate mixing. Other experimental methods of the present invention for example may be designed to demonstrate chemical reactions, which either produce a color from colorless liquids or disappearance of color after mixing, and these reactions may also to be used to visualize demonstrate mixing phenomena.

The third configuration shown in FIG. 2 is an electrokinetic flow and microheater configuration of a microfluidic system, which may be used for demonstrating electroosmotic flow and electrophoretic flow as well as to demonstrate the flow of liquids with bubbles. This microfluidic arrangement consists of two reservoirs connected by means of a microchannel. The reservoirs are provided with two electrodes (conducting surfaces) so that a voltage potential can be applied between the two reservoirs by a connection to a DC voltage source.

For experiments demonstrating electro-osmotic flow, the reservoirs are filled with an electrolytic solution using the connectors provided in the system. If the surface of the channel is negatively charged, then a layer of positively charged ions present in the liquid are attracted towards the surface forming a "diffuse layer" on the channel surface. If an electric field is applied to the fluid by means of a DC voltage at the two ends of the channel, the diffuse layer will move along the field towards the oppositely charged (in the present example, cathode) terminal. This generates a shear stress in the fluid which drags along the bulk of the fluid as well in the direction of the motion of the charged particles. This type of flow is called electro-osmotic flow.

On the other hand, for experiments demonstrating electrophoretic flow, charged particles such as polystyrene spheres (which are negatively charged in water) are added to de-ionized water in the main body of the channel and if the charge concentration at the walls are minimized by choosing proper materials, then the charged particles in the bulk fluid will migrate towards their oppositely charged electrodes or terminals when a DC voltage is applied between the terminals. In the present case the polystyrene particles will move towards the positive electrode (anode). These particles in turn can drag the rest of the fluid along towards the electrode.

When electric current is provided to the microheater, micro-size vapor bubbles are generated in the fluid. These bubbles follow the fluid flow and hence can be used to demonstrate the flow direction. The flow can also be visualized by adding microspheres into the fluid instead of microbubbles.

Once the student gains familiarity with the basic microfluidic components from the first microfluidic system configurations as discussed above in conjunction with FIG. 2, a second microfluidic platform, hereafter referred to as the "Advanced Microfluidic Platform" or "AMP" is provided for advanced training to the student.

This AMP configuration for the microfluidic chip is shown in FIG. 3. The external dimensions are the same as the previous configuration (50 mm×90 mm). This is a generic microfluidic arrangement for more complex experiments. The side channels connected to reservoirs modify flow from the reservoir. A variety of mixing and flow conditioning effects can be brought about and demonstrated to the student by this generic microfluidic system.

One training objective of having this AMP configuration is to assign simple microfluidic tasks for the students so that they can devise their own solutions to the problem for achieving the set tasks. As an example, one could assign the task of mixing three or more liquids with different flow rates to achieve a certain proportion in the mixture and collecting them in the receiver at the right-hand side of the chip. The student would then have to connect the right pump and valve, and be able to monitor the flow rates of all the three liquids.

One embodiment of the present invention envisions the microfluidic systems made for either "single-use" or disposable type while the other parts of the apparatus are permanent in nature. This means that the microfluidic system is to be used only once beyond which the microchannels, pumps and valves are contaminated with liquids and reagents left from the experiments and cannot be used again. Thus, each time the learner begins with a new microfluidic plate to ensure proper results from his experiments.

The following experiments are examples, which demonstrate how the present microfluidic apparatus can be used to train the student in the use of microfluidic devices using the above-described educational and training systems.

EXPERIMENT 1

Operation of a Simple Microfluidic Channel Using a Micropump and Measurement of Flow Rate Versus Pressure Drop in the Channel The microvalve is set to fully open position and the reservoir on the left side and the microchannel up to the pump is filled with a liquid such as water using a syringe or a pressurized container. A dye may be added to the water before filling the reservoir for better observation. The pressure across the pump is measured using a sensitive pressure transducer. The average flow rate is obtained by measuring the time taken to empty the reservoir and knowing the volume of the reservoir (flow rate=(reservoir volume)/(time taken to empty the reservoir)). The backpressure for the pump is increased by constricting the flow downstream of the pump by a small needle valve or by introducing other constrictions in the flow downstream. The experiment is repeated for a few backpressure settings. By plotting the pressure vs. flow rate from the resulting data, the characteristics of the micropump are obtained.

EXPERIMENT 2

Mixing of Two Liquids in a Microchannel

The reservoirs are filled with a red dye and a blue dye. The liquids are pumped into the channel continuously and due to the laminar flow of the two liquids in the channel, it will be observed that the two fluids barely mix but flow as individual "layers" in the channel. Then the two fluids are pumped in alternating fashion so that small slugs (of the order of 500 microns length) of alternate red and blue fluids are seen in the beginning of the channel. It will be observed that as these slugs move to the other end of the channel, the two fluids get mixed and the distinct demarcation of the slugs disappear due to the increased surface area of interaction between the two fluids.

EXPERIMENT 3

Electro-Osmotic Flow

The microchannel is filled with an electrolytic solution such as sodium chloride solution followed by the addition of some microspheres in the electrolyte solution for visualizing the flow. A DC voltage supply (10–50 V) is connected to the two electrodes in the reservoirs of the system. When the voltage supply is turned on one can then observe the fluid flow due to the migration of the ions near the wall of the microchannels.

EXPERIMENT 4

Electrophoretic Flow

Electrophoretic flow can be visualized by using de-ionized water and adding polystyrene particles into the flow. Similar to Experiment 3, when an electric field is applied to the fluid through the two electrodes, the negatively charged polystyrene particles will migrate towards the anode drawing along with them the fluid around the particles. This creates a easily observable fluid flow from the cathode to the anode reservoirs.

EXPERIMENT 5

Development of a Microfluidic Process using the Advanced Microfluidic Platform In this experiment, the student is given an assignment to develop a specific process using the AMP system. The student is required to develop a protocol for achieving the desired process. As an example, three liquids A,B, and C are required to be mixed in a given proportion and in a given order. Liquids A and B are to be completely mixed before adding liquid C. Thus the student has to predetermine and set the flow rates for the liquids A and B and also provide enough mixing time before liquid C is added. Liquid C will be added downstream and proper care must be taken to prevent back pressure from the pump for liquid C to affect the flow rates from reservoirs of liquids A and B. Thus the student learns the use of a given system to design an assigned process.

Thus, as seen by the detailed description of the present microfluidic educational apparatus and the five experiments, the student may progressively gain hands-on experience with the use of various microfluidic systems and their functional elements such as micropumps, valves, mixing chambers, the instrumentation used to measure the flow properties, the techniques to design basic to advanced microfluidic experiments, the software based control, collection and interpretation of microfluidic data, and the interfacing of the microfluidic systems with microscopes, computers and recording devices.

While the present invention has been described with reference to specific embodiments in, it is noteworthy to emphasize that many modifications and alterations may be made which fall within the scope and spirit of the instant invention as will be readily apparent to those of ordinary skill in this technology.

What is claimed is:

1. A microfluidic technology educational apparatus comprising:
    a traversing platform located under a microscope and/or a camera;
    a plate located on said traversing platform and containing a plurality of microfluidic systems fabricated thereon;
    said plate positioned such that said microscope and/or camera may be focused on any of said microfluidic systems;
    a transparent protective cover on said plate;
    a computer based control and data acquisition system;
    a software interactive guide and/or an instruction manual, including instructions for performing at least one educational experiment using said microscope and/or camera and said microfluidic systems;
    computational fluid dynamics software;
    and a monitoring and/or display system.

2. The apparatus of claim 1, wherein said plurality of microfluidic systems on said plate having different flow structural configurations each of which designed to teach a different microfluidic technology principle.

3. The apparatus of claim 2, wherein said microfluidic systems comprise at least one functional element selected from reservoirs, microchannels, micropumps, microvalves, fluidic connectors, pressure transducers, flow measurement and observation ports, microheaters, fluid injection mechanisms, or electrical contact points.

4. The apparatus of claim 1, wherein said computer based control system is adapted to; a) provide operational instructions to a student, b) operate said microfluidic systems, c) record flow measurement and other properties, and d) display the generated data.

5. The apparatus of claim 1, wherein said computational fluid dynamics software is capable of simulating flow data in said microfluidic systems and comparing experimental flow data with said simulated flow data.

6. The apparatus of claim 3, wherein said microfluidic systems are adapted to provide both basic and advanced microfluidic experiments for the student.

7. A method of teaching microfluidic technology education using a microfluidic educational apparatus comprising
    a traversing platform located under a microscope and/or a camera;
    a plate located on said traversing platform and containing a plurality of microfluidic systems fabricated thereon;
    said plate positioned such that said microscope and/or camera may be focused on any of said microfluidic systems; a transparent protective cover on said plate;
    a computer based control and data acquisition system;
    a software interactive guide and/or an instruction manual, including instructions for performing at least one educational experiment using said microscope and/or camera and said microfluidic systems;
    computational fluid dynamics software; and a monitoring and/or display system comprising the steps of: providing a plate having a plurality of microfluidic systems each having microchannels configured on said plate; providing operational instructions to conduct an experiment using one of said plurality of microfluidic systems configured on said plate; filling a reservoir of one of said plurality of microfluidic systems with a liquid by means of a syringe or a pressurized container;
    visually observing the liquid flow in said microchannels of one of said plurality of said microfluidic systems; measuring said liquid flow pressure by means of a pressure sensitive transducer; obtaining the average flow rate for a given set of system settings;
    repeating said liquid flow pressure measurement under several additional system settings; plotting the flow pressure vs. flow rate from the collected measurements; and
    determining the characteristics of one of said plurality of microfluidic systems.

* * * * *